United States Patent [19]
Tanabe et al.

[11] Patent Number: 5,218,497
[45] Date of Patent: Jun. 8, 1993

[54] MAGNETIC RECORDING-REPRODUCING APPARATUS AND MAGNETORESISTIVE HEAD HAVING TWO OR MORE MAGNETORESISTIVE FILMS FOR USE THEREWITH

[75] Inventors: Hideo Tanabe, Higashimurayama; Masahiro Kitada, Tokyo; Noboru Shimizu, Tokorozawa; Hitoshi Nakamura, Hachioji, all of Japan

[73] Assignee: Hitachi, Ltd., Tokyo, Japan

[21] Appl. No.: 807,626

[22] Filed: Dec. 13, 1991

Related U.S. Application Data

[63] Continuation of Ser. No. 443,191, Nov. 30, 1989, abandoned.

[30] Foreign Application Priority Data

Dec. 2, 1988 [JP] Japan ................. 63-304105
Aug. 21, 1989 [JP] Japan ................. 1-213093

[51] Int. Cl.$^5$ .................. G11B 5/127; G11B 5/39
[52] U.S. Cl. ..................... 360/113; 360/126
[58] Field of Search ............ 360/113, 119, 122, 125, 360/126

[56] References Cited

U.S. PATENT DOCUMENTS

| | | | |
|---|---|---|---|
| 3,881,190 | 4/1975 | Brock et al. | 360/113 |
| 3,949,346 | 4/1976 | Makino et al. | 338/287 |
| 4,356,523 | 10/1982 | Yeh | 360/113 |
| 4,413,296 | 11/1983 | Jeffers | 360/113 |
| 4,476,454 | 10/1984 | Aboaf et al. | 338/32 |
| 4,504,880 | 3/1985 | Church et al. | 360/113 |
| 4,524,401 | 6/1985 | Uchida et al. | 360/113 |
| 4,663,607 | 5/1987 | Kitada et al. | 338/32 |
| 4,663,683 | 5/1987 | Youda et al. | 360/113 |
| 4,673,998 | 6/1987 | Souda et al. | 360/113 |
| 4,853,811 | 8/1989 | Brooks et al. | 360/103 |
| 4,860,138 | 8/1989 | Vinal et al. | 360/113 |
| 4,881,143 | 11/1989 | Bhattacharyya et al. | 360/113 |
| 4,914,538 | 4/1990 | Howard et al. | 360/113 |
| 4,967,298 | 10/1990 | Mowry | 360/113 |
| 4,987,509 | 1/1991 | Gill et al. | 360/113 |
| 5,073,836 | 12/1991 | Gill et al. | 360/113 |
| 5,079,662 | 1/1992 | Kawakami et al. | 360/113 |

FOREIGN PATENT DOCUMENTS

| | | |
|---|---|---|
| 0081240 | 6/1983 | European Pat. Off. ............ 360/113 |
| 50-65211 | 6/1975 | Japan . |
| 50-65213 | 6/1975 | Japan . |
| 51-44917 | 4/1976 | Japan . |
| 52-143811 | 11/1977 | Japan . |
| 61-182620 | 8/1986 | Japan . |
| 61-199684 | 9/1986 | Japan . |
| 62-234218 | 10/1987 | Japan . |
| 2021843 | 1/1979 | United Kingdom ............. 360/113 |

OTHER PUBLICATIONS

IEEE Trans. Magnetics Mag-7 No. 1 1970 pp. 150-154.

*Primary Examiner*—A. J. Heinz
*Assistant Examiner*—Jefferson Evans
*Attorney, Agent, or Firm*—Antonelli, Terry, Stout & Kraus

[57] ABSTRACT

A magnetic recording-reproducing apparatus is disclosed which comprises a recording inductive magnetic head, a reproducing magnetoresistive magnetic head, a read-write circuit for inputting a signal to the inductive magnetic head and for reproducing the output from the magnetoresistive magnetic head, an interface for inputting/outputting a signal between the read-write circuit and an external apparatus, and a mechanism for moving the inductive magnetic head, the magnetoresistive magnetic head and the magnetic recording medium relative to one another, wherein the information recorded on the recording medium is reproduced with an area recording density of 300 Mb/in$^2$ or more.

31 Claims, 10 Drawing Sheets

TRACK WIDTH

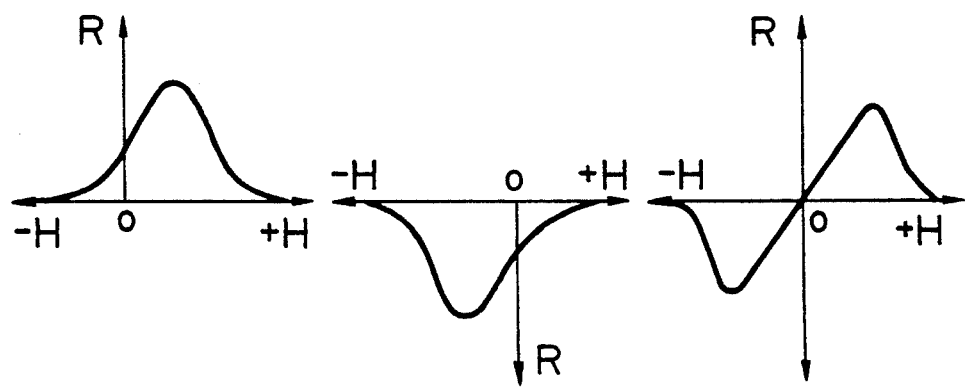
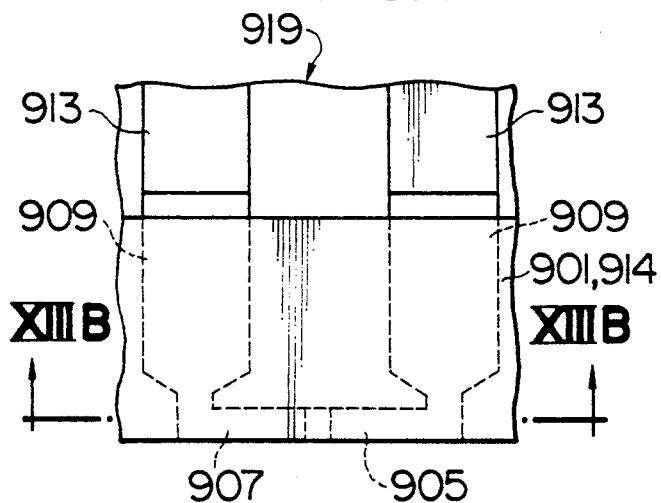
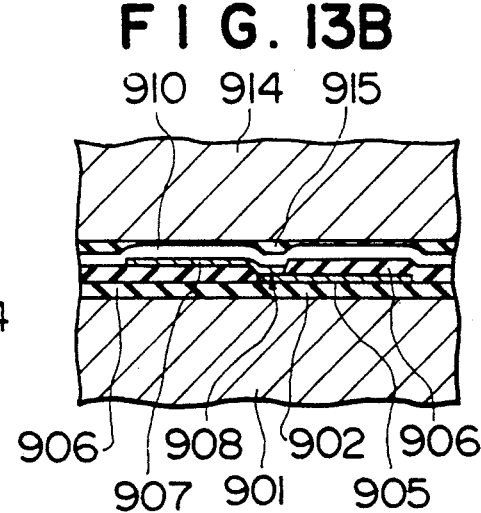
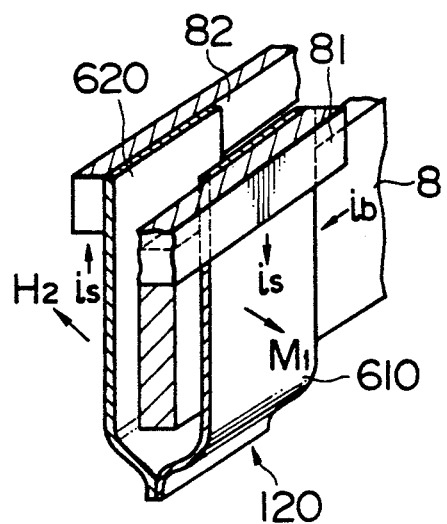

MAGNETIC RECORDING-REPRODUCING APPARATUS AND MAGNETORESISTIVE HEAD HAVING TWO OR MORE MAGNETORESISTIVE FILMS FOR USE THEREWITH

This application is a continuation of application Ser. No. 443,191, filed Nov. 30, 1989 now abandoned.

BACKGROUND OF THE INVENTION

The present invention relates to a magnetic recording-reproducing apparatus used in auxiliary storage of computers, and magnetic heads for use therewith, and more particularly to a superhigh recording density magnetic recording-reproducing apparatus and magnetic heads suitable for magnetic recording and reproduction with a narrow recording track.

For example, magnetic discs of a current commercially available magnetic recording-reproducing apparatus have a linear recording density of about 25 kBPI, a track density of about 1.5 kTPI and an area recording density of about 35 Mb/in$^2$. The magnetic heads used for these magnetic discs are inductive thin film heads. One such head records and reproduces an information signal. As the recording density increases further, however, it is difficult for a single inductive thin film head to sufficiently record data and to sufficiently reproduce the recording data from a standpoint of a head structure. Thus, it seems that the use of a composite magnetic head which separately includes a recording magnetic head and a reproducing magnetic head will be required in the magnetic recording-reproducing apparatus in the future.

Known conventional composite magnetic heads use the reproducing head of a magnetoresistive (MR) type using a soft-magnetic thin film magnetoresistive effect, as disclosed in Japanese Patent Publication JP-A-51-44917. Other conventional MR heads are ones where the direction 5 of a sense current which flows through the MR element and the direction of the signal magnetic field from a medium are normal to each other, as disclosed, for example, in IEEE Trans Magnetics, Vol. MAG-7, No. 1, March 1971, pp. 150–154. Japanese Laid-Open Patent Publication (JP-A)50-65211 discloses an MR head of the type which includes two juxtaposed such MR elements with bias magnetic fields which are generated from current magnetic fields produced by currents flowing through both the MR elements and differentially amplify the output voltages from both the MR elements. Japanese Laid-Open Patent Publication (JP-A)-52-143811 discloses an MR head where the direction of the sense current flowing through the MR element and the direction of the signal magnetic field from a medium are parallel and electrodes are formed on a medium facing surface and an opposite surface of the MR film. Japanese Laid-Open Patent Publications (JP-A)61-182620 and 62-234218 disclose an MR head where the direction of the sense current flowing through an MR element and the direction of the signal magnetic field from a medium are parallel and where two MR films are connected electrically in parallel to use magnetic fields produced by currents flowing through both the MR films in the same direction to form a single magnetic domain in the MR films, and to reduce Barkhausen noise.

As described above, if the recording density in the magnetic recording reproducing apparatus increases further in the future, a composite magnetic head which includes separate magnetic heads for recording and reproduction only will be required. Even if the conventional composite magnetic head disclosed in Japanese Patent Publication JP-A-51-44917 uses the above described conventional MR head techniques, these techniques have the following problems Thus, it cannot realize a superhigh recording density magnetic recording-reproducing apparatus which provides an area recording density of 300 Mb/in$^2$ or more.

The differential amplification type MR head disclosed in the above Publication JP-A-50-65211 is influenced by a signal magnetic field from the adjacent track because the medium facing edge of the MR film is considerably large in width compared to the track to thereby increase noise. Since it takes different times for the two superimposed MR films to absorb the signal magnetic fields, the output waveform obtained by differentially amplifying the outputs from the MR elements is greatly distorted disadvantageously. The MR heads disclosed in Japanese Patent Publications JP-A-61-182620 and 62-234218 have MR films which are connected electrically in parallel with electrodes being provided on the medium facing surface side of the MR film which is most sensitive to the signal magnetic field, so that the intensity of the resulting output signal corresponding to the signal magnetic field is low or noise due to temperature fluctuations cannot be removed. Thus, the signal to noise ratio is reduced further as the track width becomes narrower.

It is an object of the present invention to provide a superhigh recording density magnetic recording-reproducing apparatus which solves the above problems and a magnetic head suitable for recording and reproducing with narrow tracks.

SUMMARY OF THE INVENTION

In order to achieve the above object, the present invention provides a magnetoresistive effect magnetic head comprising:

means for introducing magnetic flux from a recording medium into the head;

means for dividing the introduced magnetic flux midway in a flux path; and a magnetoresistive effect film for detecting the divided flux.

In a preferred embodiment of a magnetoresistive effect magnetic head according to the present invention, the magnetic flux is introduced through a Y- or V-like magnetoresistive effect film, and divided midway and detected.

In another aspect of the present invention, a magnetic recording-reproducing apparatus comprises:

a recording inductive magnetic head;

a reproducing magnetoresistive effect magnetic head;

a read-write circuit for inputting a signal to the inductive magnetic head and for reproducing the output from the magnetoresistive magnetic head;

an interface for inputting/outputting a signal between the read-write circuit and a superior device; and means for moving the inductive magnetic head, magnetoresistive effect magnetic head and the magnetic recording medium relative to one another, wherein the information recorded on the recording medium is reproduced with an area recording density of 300 Mb/in$^2$ or more.

In a further aspect of the present invention, a magnetoresistive effect magnetic head comprises:

two magnetoresistive effect films connected electrically and magnetically to a recording medium facing surface of the head; and means for differentially amplifying the outputs from the magnetoresistive effect films.

In a still further aspect of the present invention, a magnetoresistive effect magnetic head comprises:

two magnetic shield layers disposed at a space of about 0.7 μm;

two or more magnetoresistive effect films superimposed between the magnetic shield layers; and means for differentially amplifying the outputs from the two or more magnetoresistive effect films.

In still another aspect of the present invention, a magnetoresistive effect device comprises:

a magnetoresistive effect film for detecting a signal magnetic field from a magnetic recording medium;

means for applying a bias magnetic field to the magnetoresistive effect film;

a pair of conductors for causing an electric current to flow through the magnetoresistive effect film to read the voltage across the magnetoresistive effect film;

a pair of magnetic shield members for magnetically shielding the magnetoresistive effect film, wherein the magnetoresistive effect film includes:

two magnetoresistive effect subfilms connected in series and having positive and negative $\Delta\rho$ effects in response to a magnetic field applied thereto.

In a reproducing MR head of a composite magnetic head assembly according to the present invention, the direction of a sense current flowing through the MR element and the direction of a signal from a medium are parallel. The MR film section which reads the signal magnetic field from the medium has a multilayered structure with electrodes on the respective surface of the MR films facing the medium and on the opposite sides of the films such that the voltages across the electrodes are differentially amplified and withdrawn as an output signal. In order to eliminate the difference in time between the signals entering the MR films, at least two inner layers of the multilayered MR film are combined magnetically and electrically on the medium facing side of the head. In order to control the direction of the magnetization of the multilayered MR film structure when required, a current lead is provided between the MR films. In order to achieve a linear recording density of 75 kBPI or more and a track density of 4 kTPI or more, the thickness and width of the MR film on the medium facing surface are set to 0.1 μm or less and 4 μm or less, respectively, and the spacing between an upper and a lower magnetic shield layer in the MR head is controlled so as to be 0.7 μm or less.

In order to increase the output signal, MR films of the multilayered MR element are connected in series at their ends on a side of the medium facing surface of the head electrically and magnetically so as to provide an output.

As described above, according to the present invention, the MR film structure is a multilayered one, and the voltage generated across the electrodes provided on the surfaces of the MR films facing the medium and on the opposite sides of the MR films are differentially amplified. Thus, modulation noise due to fluctuations in the ambient temperature are cancelled, and the intensity of the output signal is increased compared to a magnetic head using a single MR film. At least two inner films of the multilayered MR element are coupled magnetically and electrically on the side of the medium facing surface of the head to thereby eliminate the difference between the times when the signal magnetic field from the medium is absorbed by the combined MR films. Thus, even if the voltages indicative of the signal magnetic field generated across the respective electrodes on the MR films are differentially amplified, the waveform of the output signal from the differential amplifier is not distorted. A current lead provided between the MR films provides a magnetic field generated by a current flowing through the current lead and acts so as to bias by any quantity in opposite directions the directions of magnetization in the MR films positioned above and below the current lead. Thus, even if the voltages generated across the MR film electrodes are amplified differentially, any intensity of a signal output higher than that obtained with a head using a single MR film is withdrawn without cancelling the voltages.

In the present invention, at least two inner films of the multilayered MR element are connected magnetically and electrically on the side of the medium facing surface of the head. Electrodes are provided on the MR films opposite to the medium facing sides of the respective combined MR films such that a sense current flows across the electrodes to provide an output signal. Thus, the overall resistance between the electrodes is the sum of the respective resistances of the MR films since the respective MR films are connected in series. Therefore, if the currents flowing in the MR films are arranged so as to be the same, the voltage across the electrodes is twice as high as that generated by a head using a single MR film, and hence the intensity of the output signal corresponding to the signal magnetic field applied to the head is twice as high as that obtained by the head using the single MR layer.

In the present invention, the MR films which produces a positive and a negative $\Delta\rho$ effect are arranged in series, so that the differential effect is realized although two terminals are used. Thus, wiring is easy also for narrow tracks.

BRIEF DESCRIPTION OF THE DRAWINGS

FIGS. 9A and 9B are a front view and a cross-sectional view, respectively, of a head of another embodiment of the present invention;

FIGS. 12A, 12B and 12C illustrate the operation of the magnetoresistive effect device of the embodiment;

FIG. 13A is a plan view of the magnetoresistive effect device of the embodiment;

FIG. 13B is a cross-sectional view taken along the line XIIIB—XIIIB of FIG. 13A; and FIG. 14 is a perspective view of one embodiment of a magnetoresistive effect device according to the present invention.

DETAILED DESCRIPTION OF THE PREFERRED EMBODIMENTS

EXAMPLE 1

Figure 1:
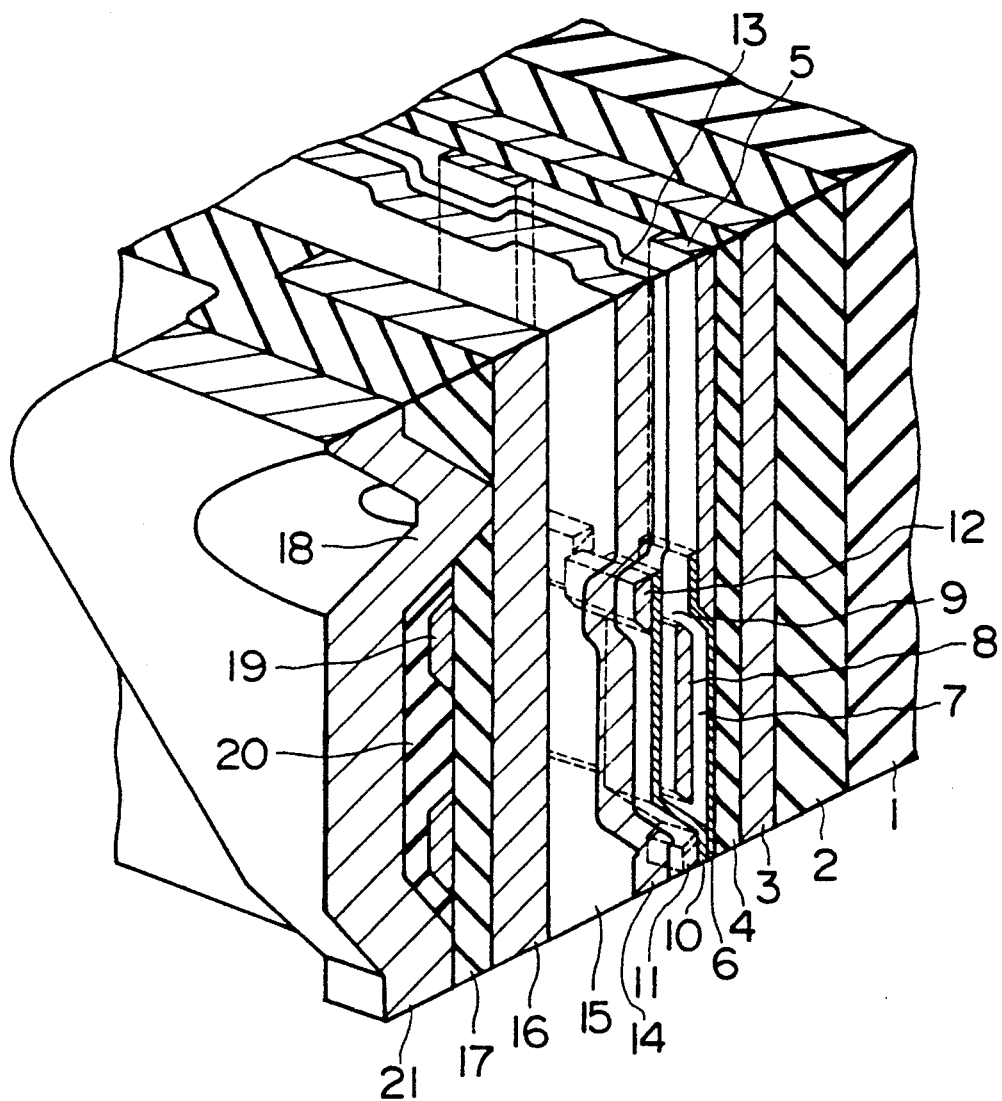
FIG. 1 is a cross-sectional perspective view of a magnetic head according to the present invention.
Figure 2:
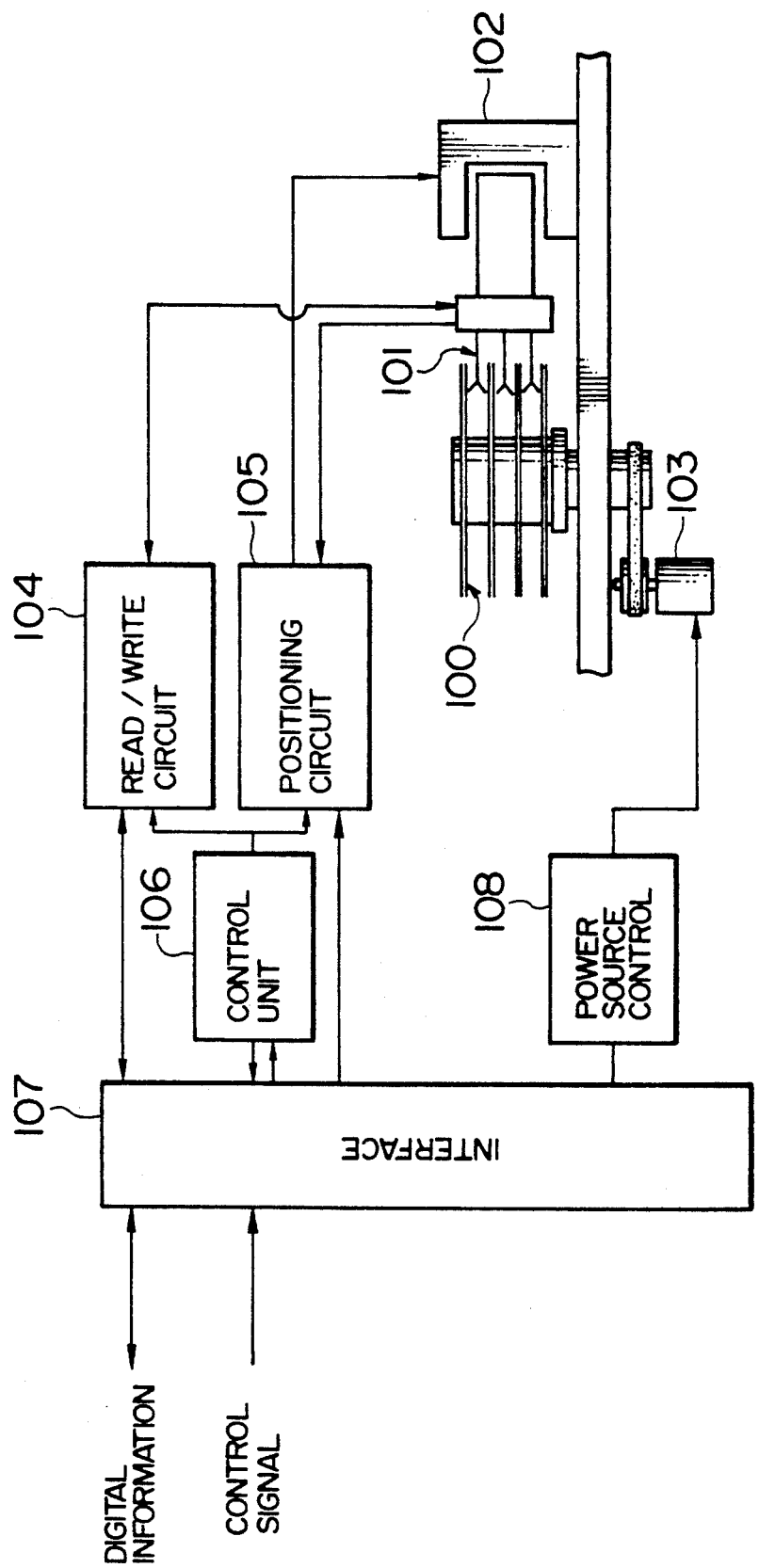
FIG. 2 schematically illustrates a magnetic disc storage device according to the present invention.

FIG. 2 schematically illustrates a magnetic disc storage system having a recording density of 300 Mb/in$^2$ or more as a first embodiment of the present invention. The main mechanism includes a recording medium 100, a magnetic head 101, an actuator 102 and a spindle motor 103. Magnetic head 101 is connected via an interface 107 to a read-write circuit 104, a positioning unit 105 and a control circuit 106. Digital information and a control signal are input to the disc storage device via interface 107. In the particular embodiment, the linear recording density is 75 kBPI (the bit length is 0.43 μm), and the track density is 4 kTPI (the track width is 4 μm). Recording medium 100 includes a Co sputted medium of a coercivity of 2000 oerstead or more. Magnetic head 101 is a composite type head having separate recording and reproducing functions which will be described in more detail later with reference to FIG. 1. Actuator 102 is controlled by positioning circuit 105 with a positioning accuracy of 0.5 μm. The spacing between recording medium 100 and magnetic head 101 is 0.1-0.15 μm. The rotation of spindle motor 103 is controlled by power source control circuit 108 so as to drive a disc-like medium.

The magnetic head which is the main portion of the present invention will now be described. FIG. 1 is a cross-sectional perspective view of the magnetic head. The head is a recording-reproducing separation type head which includes a reproducing section-recording section superimposed on a substrate in which a differential MR head of two layered MR elements is used for reproduction and in which an inductive head is used for recording. The reproducing track and recording track are 3 μm and 4 μm, respectively, in width. In order that the reproducing head has a sufficient resolution, the spacing between the shielding layers is required to be a minimum bit period or less. As shown below, in the particular embodiment, the spacing between the shielding layers is 0.68 μm, which corresponds to a bit period of about 100 kBPI.

A method of preparing such a head will now be described in detail. Deposited on a non-magnetic substrate 1, for example, of ceramics, is an insulator layer 2 such as alumina or silica, which is in turn covered with a lower magnetic shield layer 3 of a soft magnetic film. A substrate of a soft magnetic material such as ferrite may be used which also functions as a lower magnetic shield. Formed on magnetic shield layer 3 is an insulator film 4 having a thickness of 0.1-0.4 μm using sputtering. While alumina or silica may be used as the insulating layer, alumina was used as the material of the insulator layers of all the embodiments of the present invention to be described later. The spacing between the shield layer and MR elements formed later is determined by the thickness of the insulator layer. As described above, the spacing influences the resolution of the recording and reproducing characteristic, so that it must be selected depending on the recording density of the head. In the particular embodiment the thickness of the insulator layer was 0.2 μm.

Next, a conductor 5 serving as an electrode terminal for a first MR element is formed. The material of the conductor 5 may be made of a material of high conductivity such as Al or Cu. In the particular embodiment, all the conductors and conductive layers to be described later were Cu. The thickness of the conductor is 0.3 μm and the pattern of the conductor 5 was formed by regular photolithographic techniques.

Formed on the conductor pattern is an MR film of Ni-Fe alloy or Ni-Co alloy so as to be 10-100 nm using evaporation or sputtering. Then photoetching was used to form a first MR element 6 having a predetermined shape. The first MR element was 3 μm wide and three times as long as the track width to reduce the influence of a demagnetizing field. The thickness of the MR film also influences the demagnetizing field. If the demagnetizing field is strong, the dynamic range of the magnetic field of an input signal is expanded, but the head sensitivity is reduced. In the particular embodiment, the magnitude of the residual magnetization in a medium used and the head sensitivity are considered so that the film thickness of the MR element is set to be 40 nm. The magnetic-easy direction of the MR film was set so as to be across the track.

Subsequently, an insulator film 7 and then a conductor pattern 8 were formed and an insulator layer 9 was deposited. The insulator layers 7, 9 and conductor 8 each were 0.2 μm thick. The insulator layer at an end of the MR element on the medium facing side of the head was etched away to form a through hole to thereby expose a portion of the first MR element. An MR film was then deposited and worked under the same conditions as the previous MR element to form a second MR element 10 which was connected with the first MR element at the through hole. What is important in this process is that the first and second MR elements 6 and 10 are securely connected at one end electrically and magnetically and that both the elements have the same characteristics. While in the particular embodiment the two MR elements are directly connected at one end, the elements may be connected via a soft magnetic film provided therebetween.

A 0.2-μm thick electrode film was then deposited and worked to form electrode patterns 11 and 12 at the corresponding ends of the second MR element. Subsequently, a 0.2-μm insulator film 13 was deposited, and, as an upper magnetic shield layer 14, a 1-μm Ni-Fe alloy soft magnetic film was deposited.

A 3-μm insulator film 15 was then deposited, the surface of which was then flattened using an etch-back method. A 3-μm Co amorphous soft magnetic film was deposited as a lower magnetic pole 16 for the recording head under a saturated magnetic flux density of 1.5 Teslas. Regular photoetching was then conducted to form the magnetic pole 16 to a predetermined shape. The track width of the lower magnetic pole was 4.5 μm. Deposited as a gap layer between the recording magnetic poles was a 2-μm insulator film 17. A through hole 18 was then formed in the back contact section. Thereafter, a coil pattern 19 was formed in a 2-μm thick conductive layer. Subsequently, a flat resin layer 20 and then an upper magnetic pole 21 were formed under conditions similar to those for the lower magnetic pole. The width of a track in the upper pole was 4 μm. Thus the magnetic head of the particular embodiment resulted.

In the reproduction section of the particular embodiment, the sense currents flowing through the two MR elements have the same direction, so that the MR elements are magnetized in opposite directions of track traverse due to magnetic fields formed by the currents. Therefore, magnetostatic coupling is effected between the MR elements to thereby establish a stabilized magnetic structure by causing a current to flow through conductor 8 provided between the elements to generate magnetic fields to thereby magnetize the elements in opposite directions perpendicular to the width of the tracks. Therefore, by properly selecting the magnitudes of currents flowing through the conductor and the MR elements, the respective elements can have the directions of their magnetization at an angle of about 45 degrees to the direction of track traverse to thereby improve the linearity and sensitivity of the output while a stable magnetic domain structure is being maintained.

The signal flux entering the magnetic electrical junction of the element ends diverges into the MR elements and the magnetization is rotated such that the resistance to the flux in one element increases while the resistance to the flux in the other element decreases. Therefore, the outputs from electrodes provided at the leading and trailing ends of the elements can be amplified differentially, and the resulting output is twice as high as the output from a single MR element. The differential amplification serves to eliminate part of a modulation noise, for example, due to temperature fluctuations. The linearity of the output in response to the input magnetic field is improved to thereby expand the dynamic range.

Examination of the characteristics of the device of the particular embodiment having the conditions mentioned above, using the above mentioned magnetic head having a 4-μm track width and a 4 kTPI track density, revealed that the S/N ratio was 2.8 in a band of 72 MHz corresponding to a linear recording density of 75 kBPI and the resolution was 60%, and the overwrite characteristic was 25 dB or more. In order to record and reproduce an information signal at an error rate of $10^{-16}$ or less in a magnetic disc device, the device must provide an S/N of 2.5 or more, a resolution of 50% or more and an overwrite characteristic of 23 dB or more in the signal band used in the device corresponding to the recording density of the device. The above measured values all satisfy these requirements. Therefore, by using the device of the particular embodiment, it will be seen that the device provides a recording density of 300 Mb/in$^2$.

EMBODIMENT 2

Figure 3:
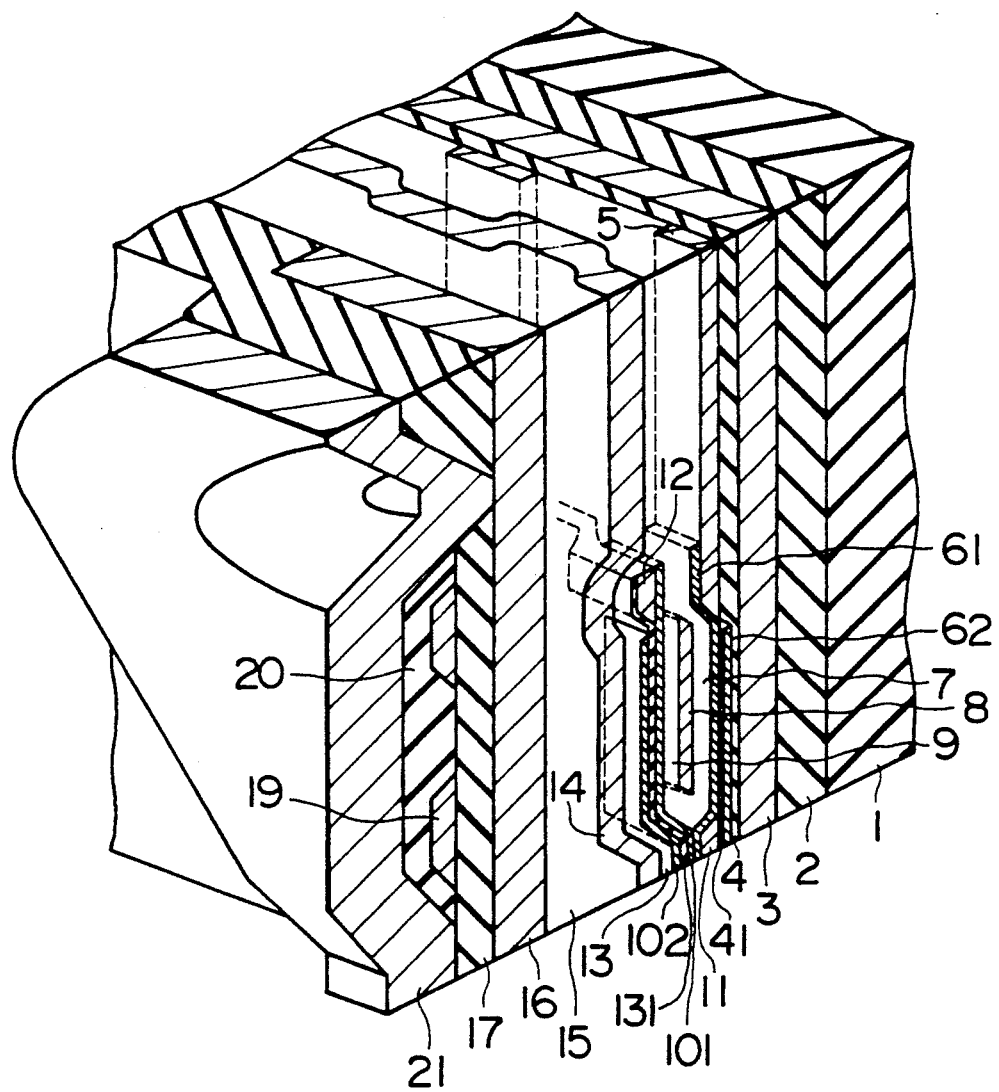
FIG. 3 is a cross-sectional perspective view of a magnetic head according to another embodiment of the present invention.

A second and a third embodiment of the present invention will now be described with reference to FIGS. 3 and 4, respectively. Both the embodiments differ mainly from the recording and reproducing device of the first embodiment with respect to the reproducing section of the magnetic head, so that both the magnetic heads of the embodiments are shown in cross sectional perspective view. FIG. 3 illustrates the head of two MR films, one including a pair of two MR films 61 and 62 and an insulator layer 41 therebetween and the other including a pair of two MR films 101 and 102 and an insulator layer 131 therebetween where the inner MR films 61, 101 are connected at one end such that electrode terminals 5, 11 and 12 supply electric currents to the MR films. The outer MR films 62, 102 are magnetized by magnetic fields produced by the sense currents flowing through the inner MR films to thereby apply to the inner MR films bias magnetic fields having directions of track traverse. Therefore, the directions of magnetization of the inner MR films are stabilized to thereby prevent the generation of an unstable magnetic domain structure which would otherwise generate Barkhausen noise. In order to enhance the effect of the two-layered MR device, the insulator layers are preferably thin, but were selected to be 50 nm thick from a standpoint of electrical insulation. The shape of the MR element is similar to that of the first embodiment. As in the first embodiment, the currents flowing through the first and second MR elements apply bias magnetic fields similar to those in the first embodiment to thereby stabilize the magnetic domain structure. Since the spacing between the adjacent MR films of the particular embodiment is narrow compared with the first embodiment, the magnetic domain structure is stabilized more efficiently. While in the particular embodiment the outer film 62, 102 are only required to be a soft magnetic film, so that they may be another appropriate material.

As described above, as the particular embodiment serves to stabilize the magnetic domain structure efficiently by employing the two-layered MR device to thereby ensure the suppression of Barkhausen noise.

EMBODIMENT 3

Figure 4:
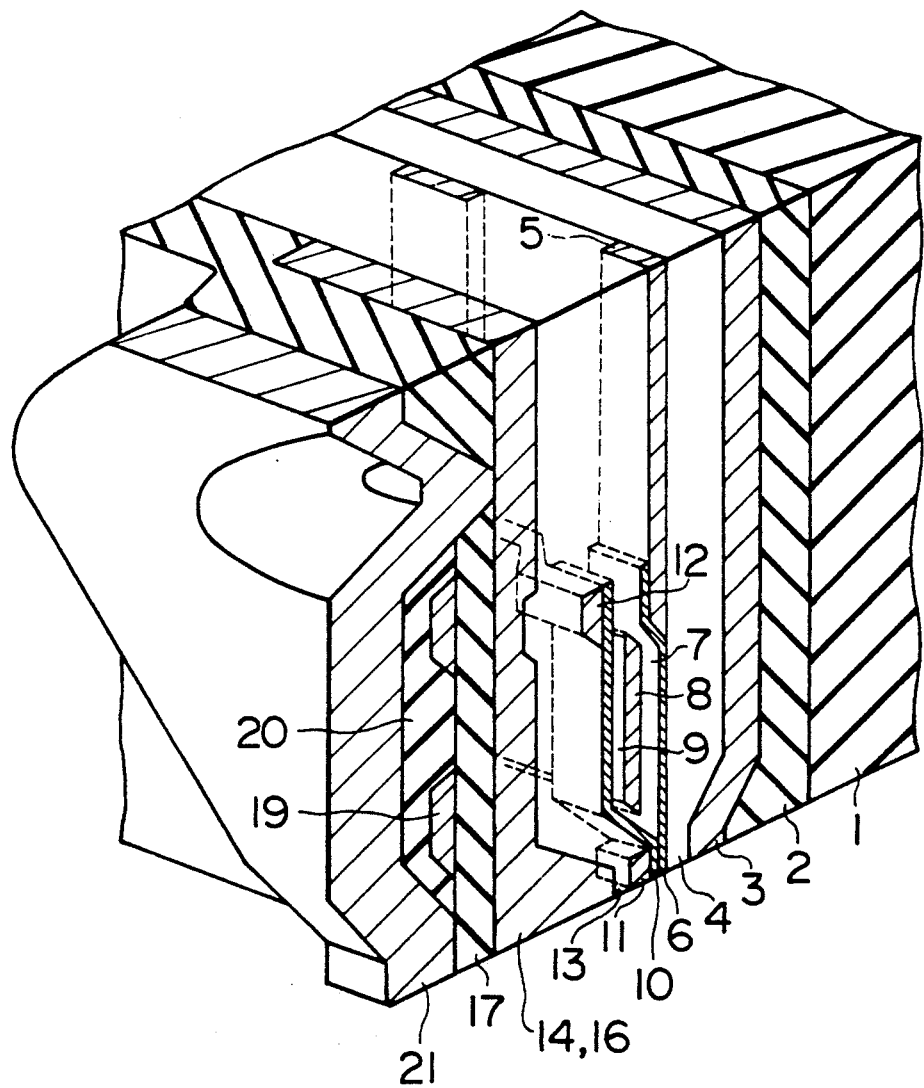
FIG. 4 is a cross-sectional perspective view of a magnetic head according to a further embodiment of the present invention.

A third embodiment of FIG. 4 is intended to reduce a stray field entering from the MR films to a shield layer. The distance between the shield layer and the MR films was selected to be large except in the vicinity of the medium facing surface of the device. The head was fabricated as follows. First, a 2-μm deep recess was formed having a tapered side in a substrate side and a shield layer 3 was then formed. An insulator layer 4 was then deposited so as to be 3 μm or more thick and flattened using an etch-back method. Subsequently, like the first embodiment, two MR films 6 and 10 and a conductor 8 were formed. The shape of the MR films were similar to those of the first embodiment. An insulator layer 15 was then deposited so as to be 2 μm or more thick and then the insulator layer was removed at an end of the device on the medium facing side. Thereafter, an insulator film 151 was deposited over so as to be 0.2 μm thick and a soft magnetic film functioning as shield layer 14 and a lower magnetic pole 16 was formed on the insulator film 151. In the particular embodiment, a Co amorphous alloy was employed as the soft magnetic film. Subsequently, in order to flatten the surface of the magnetic film, an etch-back method was used. In consideration of a decrease in the film thickness due to the etch-back, the thickness of the magnetic film was set to 4 μm. Thereafter, insulator layer 17, coil 19, flattened layer 20, and upper magnetic pole 21 were formed to constitute the recording head section on the same conditions as those mentioned above.

The reproduced output from the such head increased by about 30% compared to the first embodiment. Thus, the S/N ratio was improved and the formation of narrow tracks was effected successfully.

EMBODIMENT 4

Figure 5:
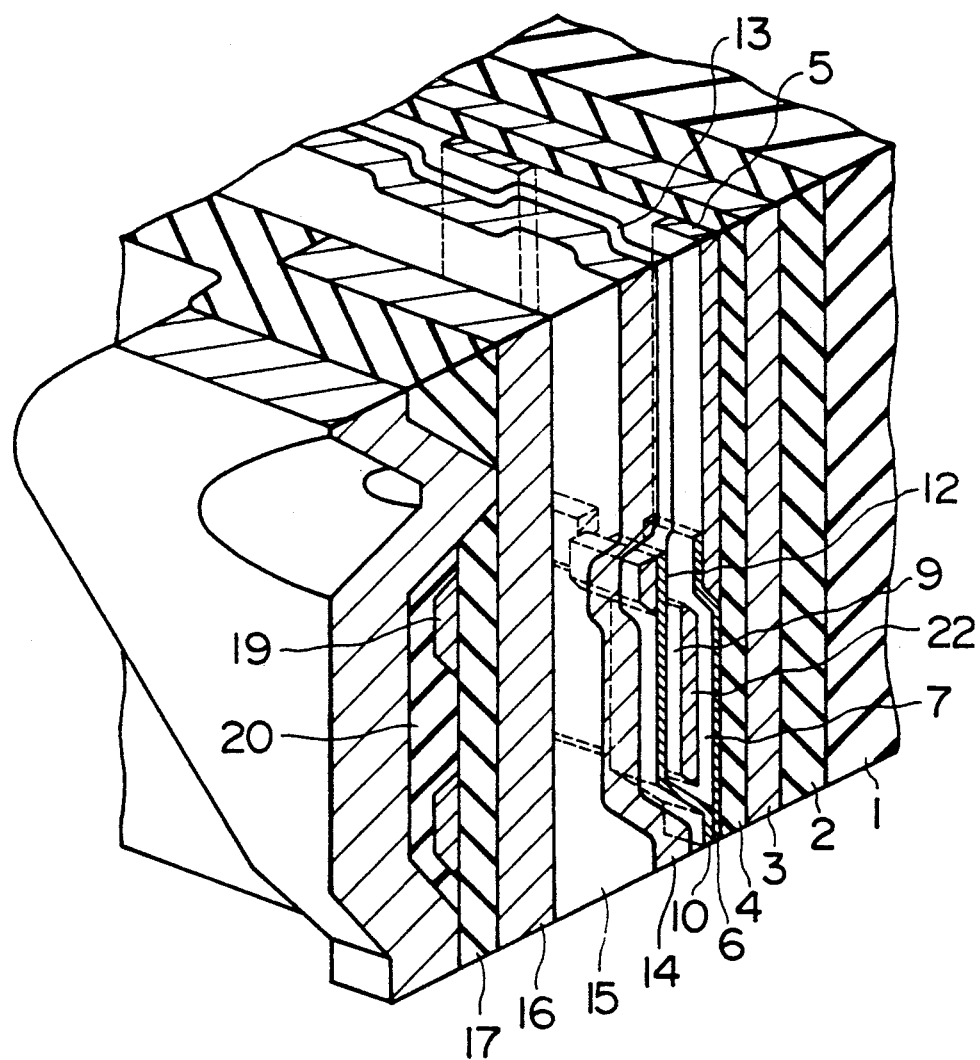
FIG. 5 is a cross-sectional perspective view of a magnetic head according to a further embodiment of the present invention.

Now, a fourth embodiment is illustrated which is also characterized by a reproducing head section. FIG. 5 illustrates the head structure. Like the first embodiment, the reproducing section includes two MR films 6 and 10 which are connected in series to thereby provide an output comprising the sum of both the outputs from the MR films. Thus, electrode terminals are not provided on the medium facing surface of the MR films, but only at ends of the MR films on the opposite side of the head from its medium facing surface.

The head was fabricated as follows. Up to the first MR film the head was prepared using a process similar to that employed in the formation of the first embodiment, and subsequently, insulator layer 7 was formed. A 0.2-$\mu$m thick Co-Pt film was then deposited and processed to form a permanent magnet film pattern 22. As described later, the pattern was used to generate a bias magnetic field. Subsequently, a second MR film was formed via an insulator layer 9. Electrode 12 was then formed on an end of the MR film. Thereafter, like the formation of the first embodiment, insulator layer 13, and shield layer 14 were formed, and then a recording section was formed. After the formation of the head, a direct current magnetic field was applied to the head in a direction perpendicular to the width of the tracks for magnetizing the permanent magnet.

As described above, since both the MR films were connected in series, the sense currents from the MR films had opposite directions, so that by the magnetic fields generated by both the currents both the MR films were magnetized in the direction where they traversed the tracks. The permanent magnet film 22 provided between both the films applies a bias magnetic field across each of the films in the same direction. Further, the signal magnetic field from a medium rotates the magnetization of the films in the same direction. Therefore, both the MR films exhibit the same change in resistance in response to the signal magnetic field applied thereto. Thus, the output from the electrodes 5 and 12 connected in series is twice as high as that of a single element. Thus, the particular embodiment provides a high output comprising the sum of both the outputs. The magnitude of the bias depends on the thickness of the permanent magnet and the magnitude of the sense current, so that an appropriate magnet thickness should be selected.

EMBODIMENT 5

Figure 6:
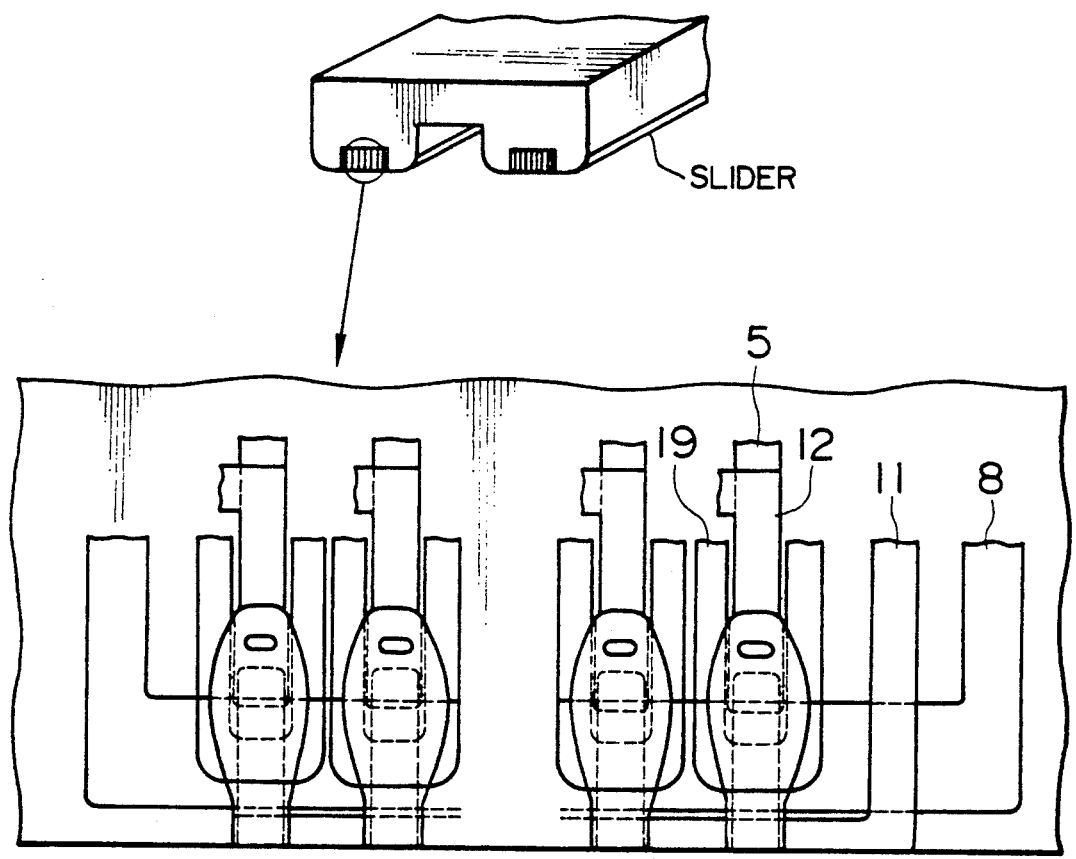
FIG. 6 is a cross-sectional perspective view of a magnetic head according to a still further embodiment of the present invention.

FIG. 6 schematically illustrates a fifth embodiment of a recording-reproducing apparatus which comprises a multi-track head device which includes a plurality of composite heads of the recording-reproduction separation type provided on a single slider. The main mechanical portion of the recording-reproducing device includes a recording medium, the magnetic head, actuator and spindle motor and is connected to an interface for a computer via a read-write circuit for a multi-track, track head, a positioning circuit and a power source control unit. Also in the particular embodiment, the linear recording density is 75 kBPI (the bit length is 0.43 $\mu$m) and the track density is 4 kTPI (the track width is 4 $\mu$m). A Co sputtered medium having a coercive force of 2000 oersteds or more is used for the recording medium. FIG. 6 is a perspective view of a multi-track magnetic head used and an enlarged plan view of the head portion. In the particular embodiment, a plurality of heads are formed on a rail on each side of the slider. The pitch of the head is required to be an integer times the track pitch in order to use the recording medium surface effectively. In the particular embodiment, the pitch is twice the track pitch. In FIG. 6, electrode 11 for the MR film on the medium facing surface side and conductive pattern 8 formed between the two MR films are used in common. Electrodes 5, 12 for the MR films; recording magnetic poles 16, 21; and coil 19 on the opposite side of the heads from the medium facing surface are provided in each head.

In the particular embodiment, a recording density similar to that obtained by the first embodiment is realized. Since a plurality of data can be recorded and reproduced simultaneously, the data transfer rate is greatly improved.

EMBODIMENT 6

Figure 7A:
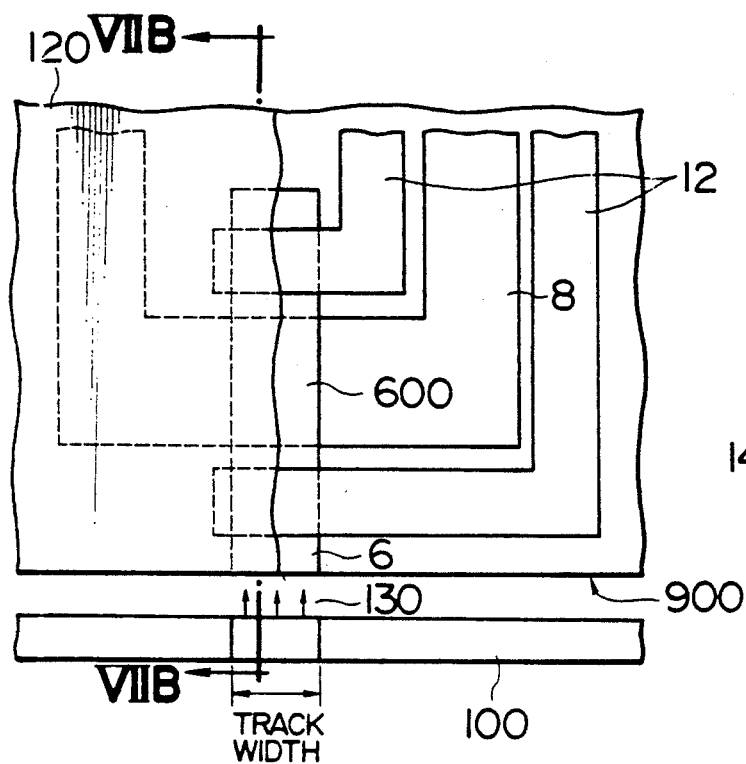
FIGS. 7A and 7B are a front view and a cross-sectional view, respectively, of a magnetoresistive effect device of one embodiment of the present invention.
Figure 7B:
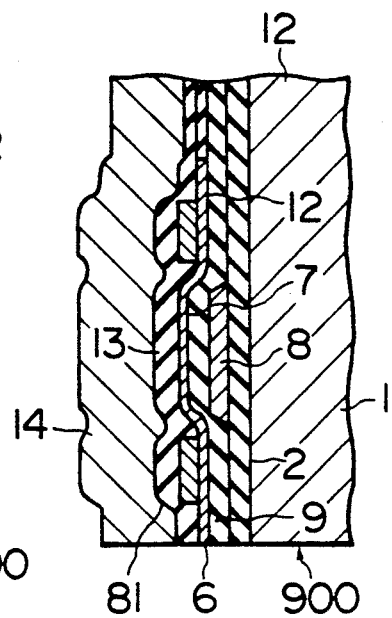

Another embodiment of the present invention will be illustrated in FIGS. 7A and 7B. A conventional magnetoresistive element includes a separate soft magnetic thin film provided in a magnetic field active region of the element provided spaced from the medium facing surface in order to guide signal magnetic flux from a magnetic recording medium, as disclosed in Japanese Patent Publication JP-A-63-18506. In the conventional techniques disclosed in the JP-A-63-18506, an insulator layer is provided between the soft magnetic thin film for guide of the signal flux and the magnetic field active region of the magnetoresistive film, so that the magnetic resistance between these films increases to reduce a quantity of signal flux introduced in the magnetic field active region. Therefore, the signal reproducing efficiency of the magnetoresistive element is low disadvantageously.

In the particular embodiment, a magnetoresistive film itself extended to the recording medium facing surface and took a shape extending in the form of a strip from the medium facing surface. Current leads were then formed sequentially spaced from the medium facing surface.

FIG. 7A is a front view of a magnetoresistive element according to one embodiment of the present invention. FIG. 7B is a cross-sectional view taken along the line XIIB—XIIB of FIG. 7A. An insulator layer 2 of Al$_2$O$_3$ or SiO$_2$ was deposited so as to be 0.1–0.4 $\mu$m, for example, using sputtering, on a substrate 1 which also functioned as a lower magnetic shield of a magnetic material such as ferrite (the substrate may include a soft magnetic thin film for the lower magnetic shield desposited on a non-magnetic material, for example, of ceramics, via an insulator layer, for example, of Al$_2$O$_3$). A conductive film 8 of a good conductor such as Al, Cu, Nb or Ti was deposited on the insulator layer 2 using evaporation or sputtering to apply a bias magnetic field to a magnetic field active region 600 of magnetoresistive film 6. Then, patterning was effected so as to provide a predetermined shape using photolithography and dry or wet etching.

Magnetoresistive film 6, for example, of Ni-Fe alloy or Ni-Co alloy was deposited so as to be 10–100 nm thick using evaporation or sputtering via a 0.1–0.2 $\mu$m thick insulator layer 9 of the same material as insulator layer 2. Photolithography and dry etching were then used to provide a predetermined patterned shape. Magnetoresistive film 6 is equal in width to a track on magnetic recording medium 100 and has a length equal to three times the width of the track to reduce the influence of demagnetizing field.

The magnetic easy direction of magnetoresistive effect film 6 was selected so as to be the shorter axis direction of the pattern. Signal sense current introducing leads 81, 12 of Al, Cu, Nb or Ti were sequentially formed spaced from recording medium facing surface 900 on magnetoresistive film 6. The distance from recording medium facing surface 900 to current guide lead 81 is required to be larger than the maximum quantity of abrasion produced when the magnetoresistive element is operated over magnetic recording medium 100. The spacing between current introducing leads 12 and 81 is required to be the track width or more in consideration of the output from the magnetoresistive element 120. It is preferable that the distance from the recording medium facing surface to current introducing lead 81 should be appropriately selected depending on a device using the particular embodiment. For example, if the particular embodiment is used in a device such as a magnetic disc storage device where a quantity of abrasion is small, the distance is preferably 1-10 μm. In a device which uses a magnetic tape where the quantity of abrasion is large, the distance should be selected so as to increase the quantity of abrasion by 2-5 μm. In any event, the width of the magnetoresistive film is preferably small.

A magnetoresistive element 120 was prepared by depositing a 0.1-0.8-μm thick insulator film 13 of $Al_2O_3$ or $SiO_2$ and then a 0.3-3-μm thick soft magnetic thin film 14 of permalloy for the upper magnetic shield (or bonding a soft magnetic material of ferrite with an additive).

In the magnetoresistive element 120 of the particular embodiment, the signal flux 130 leaking out from magnetic recording medium 100 enters magnetoresistive film 6 exposed on the medium facing surface 900 to be led to magnetic field active region 600, which senses a change in the voltage corresponding to a change in the resistance of the magnetic field active region from the sense current introducing leads 12, 81 using the fact that the resistance of the magnetic active section 600 changes depending on the magnetoresistive effect by the signal flux introduced into the magnetic field active region. Thus, the signal indicative of records on the magnetic recording medium 100 is read. In this case, it is required that an appropriate current flow through conductive film 8 to apply an appropriate bias magnetic field to the magnetic field active region 600 of the magnetoresistive film 6 such that the direction of the magnetization in the magnetic field active region has an angle of about 45 degrees to the direction of the sense current.

Figure 8A:
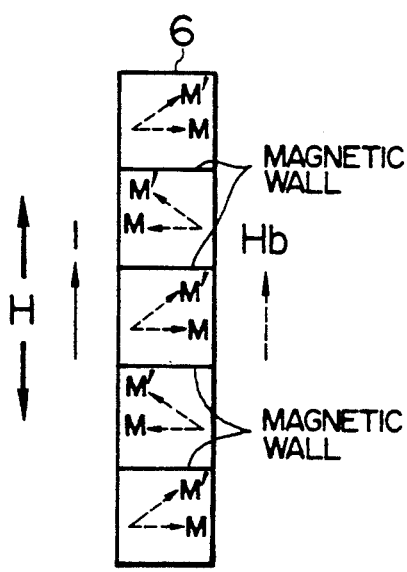
FIGS. 8A and 8B illustrate the operational principle of the embodiment of the present invention.
Figure 8B:
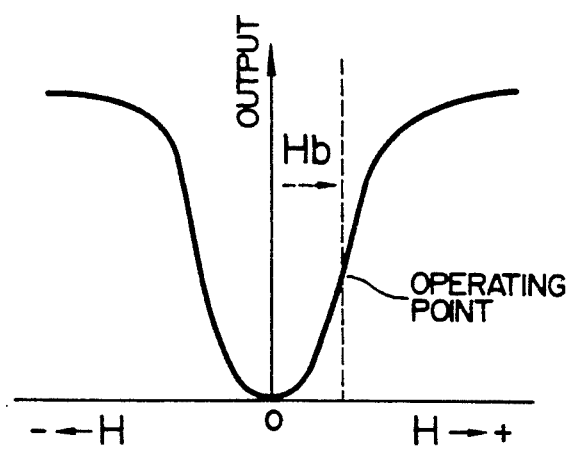

FIGS. 8A and 8B illustrate the operational principle of the magnetoresistive element 120. FIG. 8A illustrates the magnetization of magnetoresistive film 6 while FIG. 8B illustrates an external magnetic field 6 response curve on the output from magnetoresistive element 120. In magnetoresistive film 6 of the particular embodiment, several magnetic domains are formed in which the directions of magnetization M in adjacent magnetic domains are parallel, and perpendicular to the direction of current I, as shown in FIG. 8A. As shown in FIG. 8B, the external magnetic field response curve on the output from the element obtained when an alternating magnetic field H is applied to the element so as to be parallel to the direction of current I is such that when the external magnetic field H increases in any of the senses of + and − the output increases parabolically. However, under such conditions, even if + and − signal magnetic fluxes are applied, the output from the element only increases and the polarity does not change. Therefore, the signal cannot be read. If a bias magnetic field Hb is applied in the direction of FIG. 8A, the direction of magnetization in the magnetic domains is inclined in the direction of M' so as to be at an angle to the direction of current I. Thus, as shown in FIG. 8B, the operating point in a null external magnetic field of the external magnetic field response curve shifts to thereby provide outputs of opposite polarities depending on +, − signal magnetic fluxes and hence to allow signal reading.

According to the particular embodiment, signal flux 130 is directly guided from magnetoresistive film 6 exposed on medium facing surface 900 to magnetic field active region 600. Furthermore, the influence of the demagnetizing field in the longer pattern axis of magnetoresistive film 6 is very small, so that the quantity of signal magnetic flux entering the medium facing surface 900 is guided without decrease due to leakage to the magnetic field active region 600. Thus, the output from the element 120 is enhanced compared to the conventional device.

EMBODIMENT 7

Figure 9A:
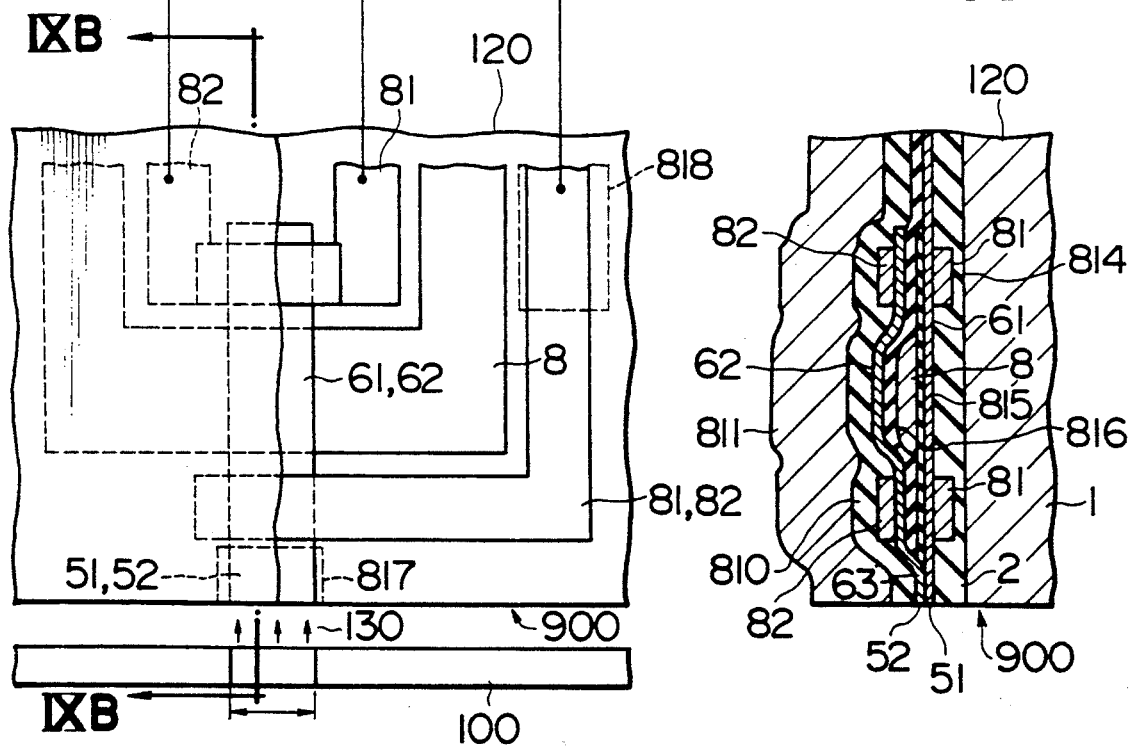

FIG. 9A is a front view of a magnetoresistive element according to another embodiment of the present invention. FIG. 9B is a cross-sectional view taken along the line IXB—IXB of FIG. 9A. In the particular embodiment, like embodiment 6, a groove 814 was formed to receive sense current leads 81 in insulator layer 2 deposited on a substrate 1 using dry etching such as photolithography and ion milling. Current guide leads 81 of Al, Cu, Nb or Ti were then embedded in groove 814. Thereafter, magnetoresistive film 51 of Ni-Fe alloy or Ni-Co alloy was deposited so as to be 10-100 nm thick using evaporation or sputtering. Then, patterning was effected so as to provide a shape similar to that obtained in the embodiment 6 using similar processes. At this time, current lead 81 and magnetoresistive film 51 were put in contact with each other in a conductive state. Insulator layer 815 of the same material as insulator layer 2 was then deposited so as to be 0.05-0.2 μm thick. Conductive film 8 for application of a bias magnetic field was prepared similarly to embodiment 6. At this time, the edges of conductive film 8 were inclined at an angle of 20-60 degrees to improve coverage. Furthermore, insulator layer 816 of the same material as insulator layers 2, 815 was deposited so as to be 0.05-0.2 μm thick. The second magnetoresistive film 52 was prepared so as to have the same thickness and shape as the first magnetoresistive film 51 using similar processes.

What is important is that before the second layer comprising magnetoresistive film 52 is deposited, a through hole 817 is provided in medium facing surface 900 and insulator layers 815 and 816 in the vicinity of the surface 900 and that second and first magnetoresistive films 52 and 51 are put into contact with each other on, or close to, medium facing surface 900. The magnetic easy directions of the first and second magnetoresistive films are set so as to be the same. In this case, they may be parallel to either the shorter pattern axis or the longer pattern axis. Preferably, they are parallel to the shorter pattern axis.

Sense current leads 82 were provided on the second magnetoresistive film 52. In this case, through hole 818 was also provided in insulator layers 815 and 816 so as to short-circuit the medium facing surface side of the sense current guide lead 82 and the sense current lead 81 on the medium facing surface side underlying the first magnetoresistive film 51. While the upper and lower current leads on the medium facing surface side are short-circuited, the current leads on the opposite side of the head from the medium facing surface side may be short-circuited instead. The distance between the medium facing surface 900 and the current leads and the distance between the current leads are preferably equal for the upper and lower current leads 82 and 81, and similar to the distances for the current leads in embodiment 6 and should be set to an appropriate value depending on a device using the particular embodiment as in the embodiment 6. The widths of magnetoresistive films 51 and 52 are preferably small. Lastly, like embodiment 6, insulator layer 810 was deposited and upper magnetic shield layer 811 was formed to provide a magnetoresistive element 120.

As described above, the magnetoresistive element 120 of the particular embodiment is characterized in that instead of the single magnetoresistive film 6 of magnetoresistive element 120 of embodiment 6, two magnetoresistive films are used and that the upper and lower magnetoresistive films are put into contact with each other on the medium facing surface and in its vicinity. In the magnetoresistive element 120 of the particular embodiment, the magnetoresistive films 51 and 52 exposed on the medium facing surface 900 receive signal flux 130 simultaneously and guide it to the magnetic field active regions 61 and 62 on the upper and lower magnetoresistive films. Since the upper and lower magnetoresistive films 51 and 52 are of the same material, thickness and shape, the signal magnetic flux 130 diverges substantially equally at point 63 to enter the magnetic field active regions 61 and 62 where the fact that the resistance value of each of the magnetic field active regions 61 and 62 fluctuates due to the magnetoresistive effect in response to the signal flux is used to detect a change in the voltage corresponding to a change in the resistance across current leads 81 and 82, and further that the output voltages from the respective leads are amplified differentially to read a signal indicative of records on the magnetic recording medium 100. FIG. 9A illustrates the diferential amplifier which receives output voltages at signal input terminals + and − thereof from current leads 81 and 82 and provides the output signal as the differential amplification of the output voltages from the signal output terminals. Changes in the resistance values of the magnetic field active regions 61 and 62 are equal because, as mentioned above, the same quantity of signal flux enters each of the magnetic field active regions 61 and 62, so that changes in the voltages detected by current leads 81 and 82 are equal in correspondence to changes in the respective resistance values of magnetic field active regions 61 and 62. The signal flux entering simultaneously from the medium facing surface 900 to magnetoresistive films 51 and 52 arrive simultaneously at magnetic field active regions 61 and 62. Therefore, the phases of changes in the respective voltages detected by current leads 81 and 82 are the same and no phase difference will occur.

When the output voltage is detected, an appropriate current is caused to flow through the conductive film 8 for application of a bias magnetic field as in embodiment 6. Furthermore, it is necessary to apply an appropriate bias magnetic field to the magnetic field active regions 61 and 62 of the magnetoresistive films 51 and 52 such that the directions of magnetization in the magnetic field active regions are at an angle of about 45 degrees to the direction of flow of the sense current.

As shown in FIG. 9B, by placing conductive film 8 between the upper and lower magnetoresistive films, the direction of the bias magnetic field is opposite to each of the upper and lower magnetoresistive films to thereby permit amplification of the respective output voltages differentially. Even if conductive film 8 is not provided between the magnetoresistive films, one conductive film 8 may be provided for applying a bias magnetic field to each of the magnetoresistive films.

While in the particular embodiment the current biasing method is employed, any other biasing method may be used. The operational principles of the particular embodiment are similar to those of embodiment 6.

As described above, according to the particular embodiment, the same quantity of signal magnetic flux is guided to each of the magnetic field active regions of the upper and lower magnetoresistive films simultaneously, in addition to effects similar to those of embodiment 6, mentioned above. Therefore, even if the output voltages from the magnetic field active regions are amplified differentially, the resulting differentially amplified waveform is not distorted and a high output is provided.

EMBODIMENT 8

Figure 10:
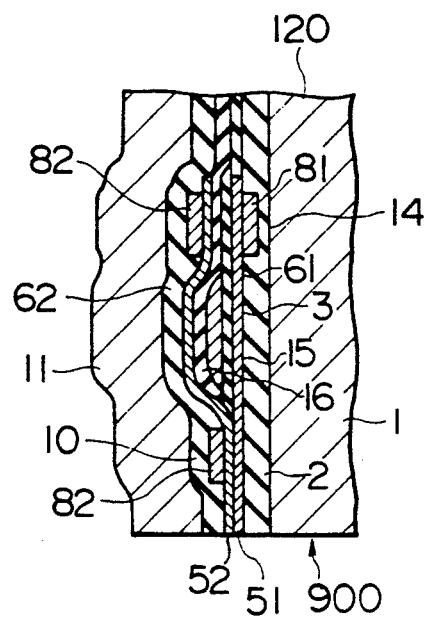
FIG. 10 is a cross-sectional view of a head of still another embodiment of the present invention.

FIG. 10 is a cross sectional view of a magnetoresistive element according to a further embodiment of the present invention in which a single common current lead replaces the upper and lower current leads, either on the medium facing surface 900 side or on its opposite side, of sense current guide leads 81 and 82 formed on the upper and lower magnetoresistive films 51 and 52 in the magnetoresistive element 120 of embodiment 7.

FIG. 10 illustrates the use of a common current lead 82 on the medium facing surface 900 side. The other remaining structure is quite the same as that of embodiment 7 and the operation and advantages of the particular embodiment are similar to those of embodiment 7.

According to the particular embodiment, the signal flux leaking out from a magnetic recording medium can be guided to the magnetic field active regions of the magnetoresistive element without being reduced, so that the output from the magnetoresistive element is enhanced. Further, the same quantity of signal magnetic flux can be guided simultaneously to each of the magnetic field active regions of the two-layered magnetoresistive element so that when the output voltages from the magnetic field active regions are amplified differentially, the resulting differentially amplified waveform is not distorted. Therefore, a magnetoresistive element having a higher output is provided. According to the particular embodiment, since the magnetoresistive films extend in the form of a strip from the medium facing surface, the output does not greatly decrease even if the track width becomes very narrow. Therefore, the effect produced by the present invention is more greatly exhibited as the track width becomes narrower.

EMBODIMENT 9

Another embodiment of the present invention will now be described below.

As disclosed in Japanese Patent Publication JP-A-50-65213, a conventional magnetoresistive element using a soft magnetic film as bias magnetic field applying means includes two conductors, one on each end of a magnetoresistive film. The output from the magnetoresistive element exhibits a parabolic output in response to an external magnetic field applied to the element. Japanese Patent Publication JP-A-61-199684 proposes a bias type magnetoresistive element which is intended to expand its dynamic range and to reduce noise, and which uses a soft magnetic thin film where the two parabolic magnetoresistive element outputs disclosed in the Publication '213 are amplified differentially. The magnetoresistive element includes three conductors: a common conductor at the center of the magnetoresistive film thereof for differentiating purposes and two further conductors, one provided on each end of the magnetoresistive film.

It is also necessary to reduce the width of the recording track in accordance with the requirement for an increase in the magnetic recording density. The magnetoresistive element disclosed in the Publication '213 is advantageous for a magnetic recording medium having narrow tracks because the two conductors are used, but it provides a parabolic output, so that the dynamic range is narrow disadvantageously. On the other hand, while in the magnetoresistive element of the differential type disclosed in the Publication '684 the dynamic range is wide advantageously, it is very difficult to prepare a magnetoresistive element having three conductors and dealing with narrowing tracks in the magnetic recording medium.

It is an object of the particular embodiment to provide a wide dynamic range magnetoresistive element which solves the just mentioned problems with the conventional techniques and which provides a differential output using only two conductors, and to provide a magnetic recording-reproducing device using the magnetoresistive element.

In order to achieve the above object, a magnetoresistive film structure used in the magnetoresistive element includes series connected magnetoresistive films having a positive and a negative $\Delta\rho$ effect in response to a magnetic field applied thereto, both the positive and negative $\Delta\rho$ effects being the same in magnitude, and two conductors connecting both ends of the joined films. In order to apply opposite bias magnetic fields to the series connected magnetoresistive films, bias applying means such as soft magnetic films are provided in contact with, or close to, the respective magnetoresistive films in facing relationship on the opposite positions in substantially the same configuration as the magnetoresistive films.

If there are no bias applying means and no bias magnetic fields are applied to the magnetoresistive films having the positive and negative $\Delta\rho$ effects in substantially the same in magnitude, the directions of magnetization in both the magnetoresistive films are the same and coincide with the directions of sense currents from the conductors provided at both the ends of the films. Under such conditions, if a signal magnetic flux is applied from the magnetic recording medium to the magnetoresistive films, the magnetoresistive film having the positive $\Delta\rho$ effect exhibits a resistance which reduces along a parabolic curve with the maximum value being when the magnetic flux is zero while the magnetoresistive film having the negative $\Delta\rho$ effect exhibits a resistance which increases along a parabolic curve with the minimum value being when the magnetic flux is zero. Eventually, a change in the resistance of the whole magnetoresistive film which comprises the series junction of the magnetoresistive effect films exhibits the sum of substantially equal changes in the resistances of the films, so that those changes in the resistances cannot be viewed virtually. Namely, series connection of the magnetoresistive effect films having negative and positive $\Delta\rho$ effects serves to produce an effect similar to taking the difference between changes in the resistances of two magnetoresistive films having a positive $\Delta\rho$ effect.

By providing bias magnetic field applying means such as soft magnetic films at opposite positions relative to the magnetoresistive films of positive and negative $\Delta\rho$ effects in contact with, or close to, the magnetoresistive films, bias magnetic fields of opposite directions produced by the interaction of the magnetic field generated by the sense current and the soft magnetic films to which the bias magnetic field is applied are applied to the magnetoresistive films. The bias magnetic fields of opposite directions act such that both the resistance values of the films having positive and negative $\Delta\rho$ effects increase or decrease relative to a bias point present when the magnetic field is zero. As a result, the whole resistance value of the magnetoresistive films joined in series exhibits a change similar to that in the resistance value obtained when magnetoresistive films having two positive $\Delta\rho$ effects to which bias magnetic fields opposite to the signal magnetic field in the magnetic recording medium are applied are operated differentially.

Figure 11A:
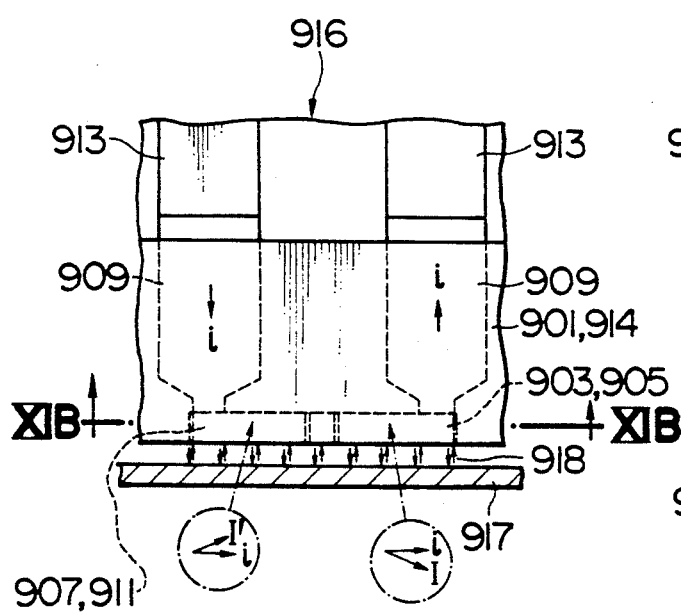
FIG. 11A is a plan view of a magnetoresistive effect device of one embodiment of the present invention.
Figure 11B:
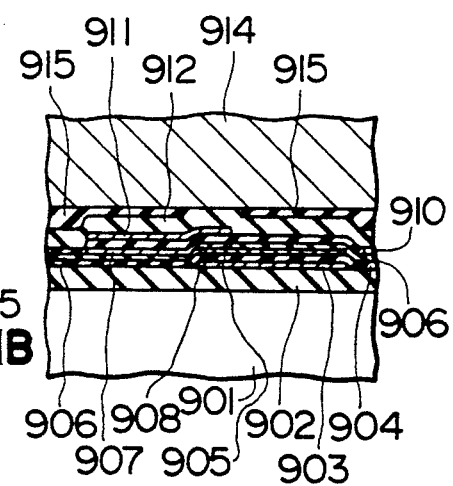
FIG. 11B is a cross-sectional view taken along the line XIB—XIB of FIG. 11A.

FIG. 11A is a plan view of a magnetoresistive element of the particular embodiment. FIG. 11B is a cross-sectional view taken along the line XIB—XIB of FIG. 11A. In the particular embodiment, insulator layer 902 of $Al_2O_3$ or $SiO_2$ was deposited so as to be 0.05–0.5 $\mu$m thick on substrate 901 of a soft magnetic material and also functioning as a magnetic shield. First soft magnetic film 903 was deposited so as to be 40–200 nm thick on the insulator using vacuum evaporation or sputtering. Photolithography was used to pattern the first soft magnetic film in a predetermined shape. The shape of first soft magnetic film 903 is preferably the same as that of magnetoresistive film 905 having a positive $\Delta\rho$ effect to be deposited subsequently. After the formation of soft magnetic film 903, insulator layer 904 of $Al_2O_3$ or $SiO_2$ was deposited so as to be 0.05–0.2 $\mu$m thick, and a magnetoresistive film 905 having a positive $\Delta\rho$ effect was deposited so as to 10–200 nm thick using vacuum evaporation or sputtering. Thereafter, photolithography was used to provide a pattern of predetermined configuration for film 905. Subsequently, insulator layer 906 was deposited so as to be 0.05–0.1 $\mu$m thick using sputtering and photolithography was used to form a through hole 908. Then, a magnetoresistive film 907 having a negative $\Delta\rho$ effect was joined in series with magnetoresistive film 905 having positive $\Delta\rho$ effect and had the same thickness and shape as film 907. Magnetoresistive film 905 having a positive $\Delta\rho$ effect may be made, for example, of Ni-Fe alloy, or one of other alloy materials having a magnetoresistive effect of a positive $\Delta\rho$ effect such as Ni-Co alloy. Magnetoresistive film 907 having a negative $\Delta\rho$ effect may be Ni-Fe-Ir alloy or one of other alloy materials having a negative $\Delta\rho$ effect. In order to obtain an output waveform symmetrical with the output waveform from a magnetoresistive film having a positive $\Delta\rho$ effect, the negative $\Delta\rho$ effect should be substantially the same in magnitude as the positive $\Delta\rho$ effect, and an anisotropic magnetic field in consideration of shape anisotropy should be substantially the same in the magnetoresistive films having positive and negative $\Delta\rho$ effects. In the particular embodiment, when magnetoresistive films 905 and 907 having positive and negative $\Delta\rho$ effects are patterned, conductors 909 were prepared at ends of the films in patterning to cause sense currents to flow therethrough.

Insulator layer 910 was then deposited so as to be 0.05-0.2 $\mu$m thick like insulator film 904. Second soft magnetic film 911 which comprised bias applying means was formed so as to be 40-200 nm thick on magnetoresistive film 907 having a negative $\Delta\rho$ effect in superimposing relationship in substantially the same shape as film 907. Insulator protective layer 912 of $Al_2O_3$ or $SiO_2$ was deposited so as to be 0.05-0.5 $\mu$m thick for forming a protective layer and a magnetic gap. Sense current introducing pad 913 was formed on conductive layer 909 by forming a through hole 908 and depositing a good conductor, for example, Cu. Lastly, soft magnetic layer 914 for magnetic shielding was bonded with adhesive 915 to provide a magnetoresistive element 916.

The operation of the magnetoresistive effect 916 will now be described. First, a sense current i is caused to flow through magnetoresistive films 905 and 907 having positive and negative $\Delta\rho$ effects through pad 913 and conductor 909. By the interaction of a magnetic field produced by the sense current i and first and second soft magnetic films 903 and 911 for bias application, the magnetoresistive films 905 and 907 are impressed with opposite bias magnetic fields. As a result, the directions of magnetization of both the magnetoresistive films, as shown by I and I', are at opposite angles 8 to the direction of current i flow (the directions of the magnetization of the magnetoresistive films are parallel to the flow of current i in the absence of the bias magnetic field). If the signal magnetic field 918 is applied from magnetic recording medium 917 under such conditions, the resistance R of magnetoresistive film 905 producing a positive $\Delta\rho$ effect changes as shown by the curve of FIG. 12A with signal magnetic field H (shown in FIG. 13A using the saturated signal magnetic field as a reference, which applies to similar curves to be illustrated later). As shown by a curve in FIG. 12B, the resistance R of magnetoresistive film 907 adjusted to produce a negative $\Delta\rho$ effect substantially equal in magnitude to the positive $\Delta\rho$ effect and substantially the same anisotropic magnetic field changes in a 180 degree symmetrical relationship to that of magnetoresistive film 905 producing a positive $\Delta\rho$ effect. Eventually, a change in the resistance value R of the whole magnetoresistive film which comprises the series connected magnetoresistive films and read from conductor 909 and pad 913 is shown by a curve in FIG. 12C where the waveform for the positive signal magnetic field H and the waveform for the negative signal magnetic field H are symmetrical with reference to the origin, so that the positive and negative signal magnetic fields H written into the medium can be detected as an output waveform corresponding to the curve configuration of FIG. 12C.

The output waveform shown in FIG. 12C and obtained by the magnetoresistive element 916 of the particular embodiment is substantially the same as the waveform obtained by the magnetoresistive element where conventional magnetoresistive films producing a positive $\Delta\rho$ effect are differentially operated. Therefore, as shown in the particular embodiment, the use of only two conductors 909 produces effects due to differential operation similar to that obtained with the conventional device. More particularly, the dynamic range of signal magnetic field H is expanded and noise is reduced. Since the use of only two conductors 909 is required, the magnetoresistive element 916 of the particular embodiment adjusts to narrow tracks.

While in the particular embodiment the soft magnetic film was illustrated as being used as the bias applying means, a shunt film or a current lead or a permanent magnet may be used as the bias applying means to provide similar effects.

While in the particular embodiment, the use of a soft magnetic bulk material is illustrated for magnetic shielding, a soft magnetic film may be used instead to provide similar effects.

EMBODIMENT 10

FIG. 13A is a plan view of a magnetoresistive element of the particular embodiment. FIG. 13B is a cross-sectional view taken along the line XIIIB—XIIIB of FIG. 13A. In the particular embodiment, instead of first and second soft magnetic films 903 and 911 which comprise bias applying means for the magnetoresistive element 916 of embodiment 9, magnetoresistive film 905 producing a positive $\Delta\rho$ effect is provided close to soft magnetic substrate 901 which functions also as a magnetic shield, while a magnetoresistive film 907 producing a negative $\Delta\rho$ effect is provided close to the other soft magnetic film 914 for magnetic shielding such that opposite bias magnetic fields are applied to films 905 and 907 by the interaction of the magnetic field produced by current i and soft magnetic films 901 and 914. Therefore, according to the process for forming magnetoresistive element 919 of the particular embodiment, the steps for forming first and second soft magnetic films 903 and 911 and insulator layers 904 and 910 in the process for manufacturing magnetoresistive element 916 of the particular embodiment 9 are omitted, so that the process for manufacturing the element is very simplified advantageously. The thickness of insulator layer 906 deposited on magnetoresistive effect film 905 producing a positive $\Delta\rho$ effect is required to be larger than the thickness of magnetoresistive effect film 905 producing a positive $\Delta\rho$ effect, and preferably is two or three times the thickness of film 905. The other steps of the process for manufacturing the device were similar to those of embodiment 9 in order to provide magnetoresistive element 919. The examination of the characteristics of element 919 revealed that the device was substantially the same in function, operation and effect as element 916 of embodiment 9.

Also in the particular embodiment, a soft magnetic film may be used instead of the soft magnetic material for magnetic shielding to provide similar performance.

EMBODIMENT 11

FIG. 14 is a perspective view of a magnetoresistive element of a further embodiment of the present invention. The magnetoresistive element shown in FIG. 14 may be produced using a thin film preparing process, preparing steps and photolithography similar to those used in the formation of the above embodiments. In the particular embodiment, magnetoresistive films 610 and 620 producing positive and negative $\Delta\rho$ effects were used, current leads 81 and 82 to introduce the sense current were provided on the medium facing surface and opposite surface of magnetoresistive films 610 and 620, respectively. Current lead 8 was provided via an insulator layer between films 610 and 620 for magnetizing direction control of the magnetoresistive films.

Films 610, 620 and current leads 81, 82 and 8 are similar in shape and size to those of the above embodiments.

In the resulting magnetoresistive element 120, a sense current $i_s$ is caused to flow via currents lead 81, 82 in one direction, a current $i_b$ of an appropriate intensity for bias magnetic field application is caused to flow through current lead 8 to magnetize films 610 and 620 in opposite directions such that the directions of magnetization $M_1$ and $M_2$ of films 610 and 620 are at an angle of about 45 degrees to the direction of sense current $i_s$ to thereby read the signal magnetic field out of the medium. If the signal magnetic field from the medium diverges to enter films 610 and 620, the resistance of films 610 and 620 increase and decrease similarly because the $\Delta\rho$ effects of the films are equal in magnitude and opposite in sign. As a result, the output voltages from current leads 81, 82 correspond to the sum of changes in the resistance value of the films. Since the output voltage waveform obtained due to different signs of the $\Delta\rho$ effects is just similar to that obtained when magnetoresistive films producing a positive $\Delta\rho$ effect are differentially operated, the produced effects are similar to those obtained by differential operation. Thus, since only two sense current introducing leads are provided in the particular embodiment, the process for preparing a device which produces similar effects is greatly simplified advantageously. The magnetoresistive element 120 of the particular embodiment produces quite similar effects produced by the above embodiments.

As described above, according to the present invention, since the ends of the two MR elements facing a medium are electrically and magnetically connected, a differential output is provided without any distortion in the output waveform even if the recording density is high since the signal magnetic field diverges so as to provide the differential output from the two MR films. Thus, a satisfactory S/N ratio is provided even if a decrease in the output occurs due to provision of narrow tracks, and a magnetic recording-reproducing device having an area recording density of 300 Mb/in$^2$ or more is realized.

As described in detail above, in the magnetoresistive element according to the present invention, the magnetoresistive films producing positive and negative $\Delta\rho$ effects are joined in series and two conductors are formed at the ends of the joined films to produce differential effects similar to those produced by the conventional differential magnetoresistive effect element having three conductors. Therefore, high density recording and reproduction is realized, and expansion of the dynamic range and reduction of noise are achieved advantageously irrespective of the use of narrow tracks.

What is claimed is:

1. A magnetic recording-reproducing apparatus comprising:
    a transducer having a recording inductive magnetic head and a reproducing magnetoresistive magnetic head;
    a read-write circuit for inputting a signal to the inductive magnetic head and for reproducing a signal from the magnetoresistive magnetic head;
    an interface for inputting/outputting a signal between the read-write circuit and an external apparatus; and
    means for moving the transducer and a magnetic recording medium relative to one another;
    wherein the magnetoresistive magnetic head includes two magnetoresistive films which are joined to each other electrically and magnetically at a portion of the magnetoresistive magnetic head near the recording medium, and which are separated from each other electrically and magnetically at a portion of the magnetoresistive magnetic head away from the recording medium.

2. A magnetic recording-reproducing apparatus according to claim 1, including electrodes connected to the magnetoresistive films to enable sense currents to flow through the films in the same direction.

3. A magnetic recording-reproducing apparatus according to claim 1, wherein the two magnetoresistive films are joined electrically and magnetically to each other at a junction at a recording medium facing surface of the magnetoresistive magnetic head, a signal magnetic flux from the magnetic recording medium being introduced into the junction.

4. A magnetic recording-reproducing apparatus according to claim 3, wherein sense currents flow substantially normal to a surface of the recording medium in the two magnetoresistive films.

5. A magnetic recording-reproducing apparatus according to claim 3, including means for outputting a difference or a sum of outputs from the two magnetoresistive films.

6. A magnetic recording-reproducing apparatus according to claim 3, including a conductive layer surrounded by an insulator layer and disposed between the two magnetoresistive films.

7. A magnetic recording-reproducing apparatus according to claim 3, including a permanent magnet surrounded by an insulator layer and disposed between the two magnetoresistive films.

8. A magnetic recording-reproducing apparatus according to claim 3, wherein the transducer has a plurality of composite heads juxtaposed in a direction transverse to a track direction of the magnetic recording medium, a spacing between adjacent composite heads being an integer times a spacing between adjacent tracks on the magnetic recording medium, each composite head including a magnetoresistive magnetic head and an inductive magnetic head arranged in the track direction.

9. A magnetoresistive magnetic head comprising:
    means for introducing magnetic flux from a recording medium into the head;
    means for dividing the introduced magnetic flux;
    two laterally aligned magnetoresistive films for detecting the divided flux, wherein each of the films is in the form of a strip having a longitudinal dimension extending transverse to a recording medium facing surface of the head, and wherein the films contact each other at the recording medium facing surface and are isolated from each other away from the recording medium facing surface such that the films are connected in series; and
    two electrodes respectively connected to the two films at portions of the films away from the recording medium facing surface where the films are isolated from each other.

10. A magnetoresistive magnetic head comprising:
    a magnetoresistive film having a Y- or V-like cross section, the Y- or V-like cross section having laterally aligned portions isolated from each other away from a recording medium facing surface of the head to divide and detect a magnetic flux introduced into the head from a recording medium; and electrodes connected to the isolated portions of the Y- or V-like cross section away from the recording medium facing surface and producing a differential output from the detected divided flux.

11. A magnetoresistive magnetic head according to claim 10, including at least one insulator layer laminated to the magnetoresistive film.

12. A magnetoresistive magnetic head according to claim 11, wherein the magnetoresistive film is disposed between soft magnetic films and is insulated from the soft magnetic films by insulator layers.

13. A magnetoresistive magnetic head according to claim 11, wherein the magnetoresistive film is disposed between shielding layers, a distance between each shielding layer and the magnetoresistive film being smaller in the vicinity of the recording medium facing surface than elsewhere in the head.

14. A magnetoresistive magnetic head according to claim 11, wherein the electrodes enable a sense current to flow through the magnetoresistive film.

15. A magnetoresistive magnetic head comprising:
two laterally aligned magnetoresistive films connected electrically and magnetically to each other at a recording medium facing surface of the head, and separated electrically and magnetically from each other away from the recording medium facing surface of the head;
electrodes connected to the two films at portions of the films away from the recording medium facing surface where the films are separated electrically and magnetically from each other, wherein the electrodes produce a differential output from the films; and
means for amplifying the differential output produced by the electrodes.

16. A magnetoresistive magnetic head according to claim 15, wherein each of the films is in the form of a strip having a longitudinal dimension extending transverse to the recording medium facing surface, and wherein the electrodes introduce sense currents to the films.

17. A magnetoresistive magnetic head according to claim 15, wherein the electrodes cause electric currents to flow through the films parallel to a direction of a signal magnetic field from a recording medium.

18. A magnetoresistive magnetic lead according to claim 15, further comprising a current lead disposed between the films for controlling directions of magnetization of the films with a magnetic field generated by a current flowing through the current lead.

19. A magnetoresistive device for reading a signal magnetic field from a magnetic recording medium using a magnetoresistive effect of a ferromagnetic thin film, wherein the ferromagnetic thin film is in the form of a strip having a width substantially equal to a track width on the magnetic recording medium and a longitudinal dimension extending transverse to a recording medium facing surface of the device, and wherein the ferromagnetic thin film extends to the recording medium facing surface, and including current leads for introducing sense currents to the ferromagnetic thin film, all of the current leads being provided on the ferromagnetic thin film away from the recording medium facing surface at mutually different distances away from the recording medium facing surface.

20. A magnetoresistive device according to claim 19, wherein a distance between each current lead and the recording medium facing surface is at least 10 μm.

21. A magnetoresistive device for reading a signal magnetic field from a magnetic recording medium using a magnetoresistive effect of two separate laterally aligned ferromagnetic thin films contacting each other so as to be electrically and magnetically connected to each other only at a recording medium facing surface of the device, wherein each of the ferromagnetic thin films is in the form of a strip having a longitudinal dimension extending transverse to the recording medium facing surface, and including:
an insulator layer disposed between the ferromagnetic thin films except where the films are electrically and magnetically connected to each other; and
current leads for causing electric currents to flow through the two ferromagnetic thin films in substantially the same direction.

22. A magnetoresistive device according to claim 21, wherein one of the current leads for causing electric currents to flow through the two ferromagnetic thin films is connected to both of the ferromagnetic thin films.

23. A magnetoresistive device according to claim 21, further comprising means for differentially amplifying and detecting output voltages from the two ferromagnetic thin films corresponding to changes in respective resistance values of the films.

24. A magnetoresistive device comprising:
a magnetoresistive film for detecting a signal magnetic field from a magnetic recording medium;
means for applying a bias magnetic field to the magnetoresistive film;
a pair of conductors for causing an electric current to flow through the magnetoresistive film to produce a voltage across the magnetoresistive film; and
a pair of magnetic shield members for magnetically shielding the magnetoresistive film;
wherein the magnetoresistive film includes:
two magnetoresistive films connected in series and respectively producing a positive $\Delta\rho$ effect and a negative $\Delta\rho$ effect in response to a magnetic field applied thereto.

25. A magnetoresistive device according to claim 24, wherein the bias magnetic filed applying means has substantially the same shape as the magnetoresistive films connected in series and is provided in contact with, or close to, the magnetoresistive films connected in series.

26. A magnetoresistive device according to claim 24, wherein the magnetoresistive film producing a positive $\Delta\rho$ effect in response to the magnetic field applied thereto is provided close to one magnetic shield member, while the magnetoresistive film producing a negative $\Delta\rho$ effect in response to the magnetic field applied thereto is provided close to the other magnetic shield member.

27. A magnetoresistive device according to claim 24, wherein the magnetoresistive films connected in series have substantially a same characteristic such that waveforms of outputs from the magnetoresistive films producing the positive and negative $\Delta\rho$ effects in response to the magnetic field applied thereto are symmetrical to each other.

28. A magnetic recording-reproducing apparatus comprising:
a magnetic head for detecting a signal magnetic flux from a high-density magnetic recording medium to read information in the magnetic recording medium, the magnetic head including two magnetoresistive films respectively having a positive $\Delta\rho$ effect and a negative $\Delta\rho$ effect, the effects being equal in magnitude, the films being joined in series; and two conductors connected to ends of the magnetoresistive films for differential driving of the two films.

29. A magnetoresistive device comprising:

a magnetoresistive film for detecting a signal magnetic field from a magnetic recording medium;

means for applying a bias magnetic field to the magnetoresistive film;

a pair of conductors for causing an electric current to flow through the magnetoresistive film to produce a voltage across the magnetoresistive film; and a pair of magnetic shield members for magnetically shielding the magnetoresistive film;

wherein the magnetoresistive film includes:

two superimposed magnetoresistive films connected in series and respectively producing a positive $\Delta\rho$ effect and a negative $\Delta\rho$ effect in response to a magnetic field applied thereto.

30. A magnetoresistive device according to claim 29, including an insulator layer disposed between the two magnetoresistive films connected in series.

31. A magnetoresistive magnetic head comprising:

two laterally aligned magnetoresistive films electrically and magnetically joined to each other at a recording medium facing surface of the head;

electrically and magnetically insulating means disposed between said two magnetoresistive films at all portions of the two magnetoresistive films except where the two magnetoresistive films are electrically and magnetically joined to each other at the recording medium facing surface; and electrodes connected to the films at portions of the films away from the recording medium facing surface to enable a sense current to flow through the films and producing a differential output from the films.

* * * * *